US011422065B2

(12) United States Patent
Amacker et al.

(10) Patent No.: US 11,422,065 B2
(45) Date of Patent: Aug. 23, 2022

(54) MOBILE PLATFORM BUMPER INCORPORATING A RAMP STRUCTURE

(71) Applicant: Toyota Research Institute, Inc., Los Altos, CA (US)

(72) Inventors: Matthew Amacker, Santa Clara, CA (US); Joseph Taylor, San Jose, CA (US); Gregory J. Klein, San Mateo, CA (US); Jonathan Yao, San Jose, CA (US); Andrew Custer, Oakland, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 555 days.

(21) Appl. No.: 16/513,129

(22) Filed: Jul. 16, 2019

(65) Prior Publication Data
US 2021/0018398 A1 Jan. 21, 2021

(51) Int. Cl.
| G01M 17/007 | (2006.01) |
| B60R 19/18 | (2006.01) |
| G08G 1/16 | (2006.01) |

(52) U.S. Cl.
CPC ......... *G01M 17/0074* (2013.01); *B60R 19/18* (2013.01); *G01M 17/0078* (2013.01); *G08G 1/16* (2013.01); *B60R 2019/186* (2013.01)

(58) Field of Classification Search
CPC ......... G01M 17/0074; G01M 17/0078; G01M 17/007; B60R 19/18; B60R 2019/186; B60R 21/36; G08G 1/16
See application file for complete search history.

(56) References Cited

U.S. PATENT DOCUMENTS

| 1,665,085 | A | 4/1928 | Cunningham | |
| 6,641,893 | B1 | 11/2003 | Suresh et al. | |
| 2013/0018526 | A1* | 1/2013 | Kelly | G01M 17/0078 701/2 |
| 2014/0144207 | A1* | 5/2014 | Weber | G01M 17/0078 73/12.07 |

FOREIGN PATENT DOCUMENTS

| KR | 200362995 | 9/2004 |
| KR | 200485545 | 7/2017 |

OTHER PUBLICATIONS

Bcp, stand-up ramps, Mar. 2013, TractorByNet, tractorbynet.com/forums/threads/stand-up-or-slide-in-ramps.273476/(Year: 2013).*
https://www.pinterest.com/pin/420101471465038972/.

* cited by examiner

*Primary Examiner* — Eric S. McCall
*Assistant Examiner* — Timothy P Graves
(74) *Attorney, Agent, or Firm* — Christopher G. Darrow; Darrow Mustafa PC

(57) ABSTRACT

A bumper for a mobile platform of a guided test platform includes a first end, a second end residing opposite the first end, a first surface extending between the first and second ends, and a second surface extending between the first and second ends and residing opposite the first surface. The bumper defines a ramp structure extending between the bumper first end and the bumper second end. The ramp structure is structured to guide a wheel of a vehicle in a direction away from the first surface as the wheel moves along the second surface in a direction from the bumper first end toward the bumper second end.

13 Claims, 4 Drawing Sheets

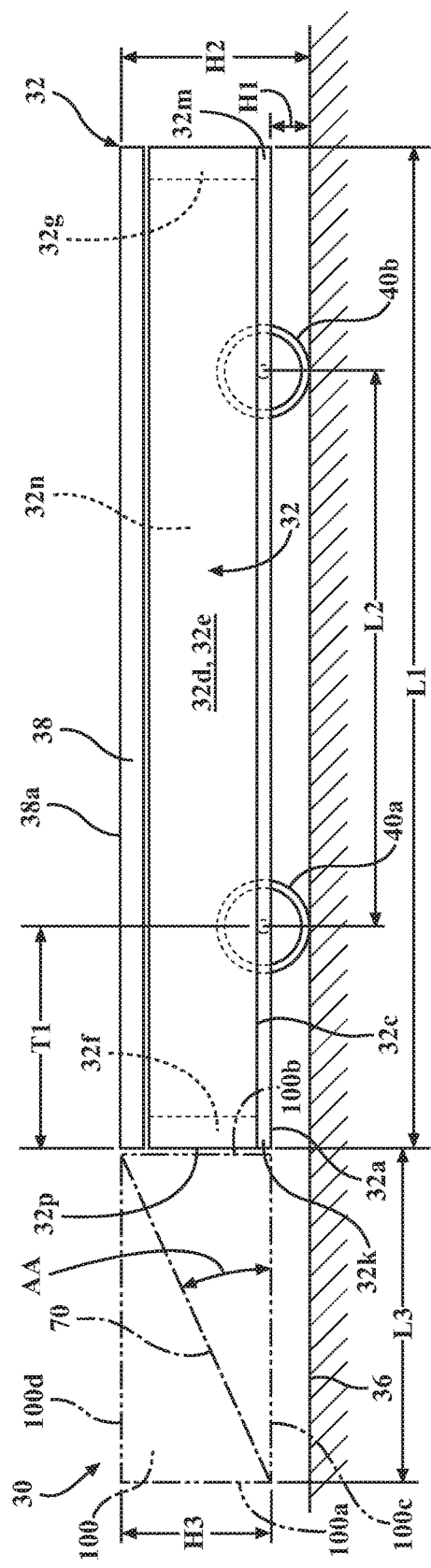
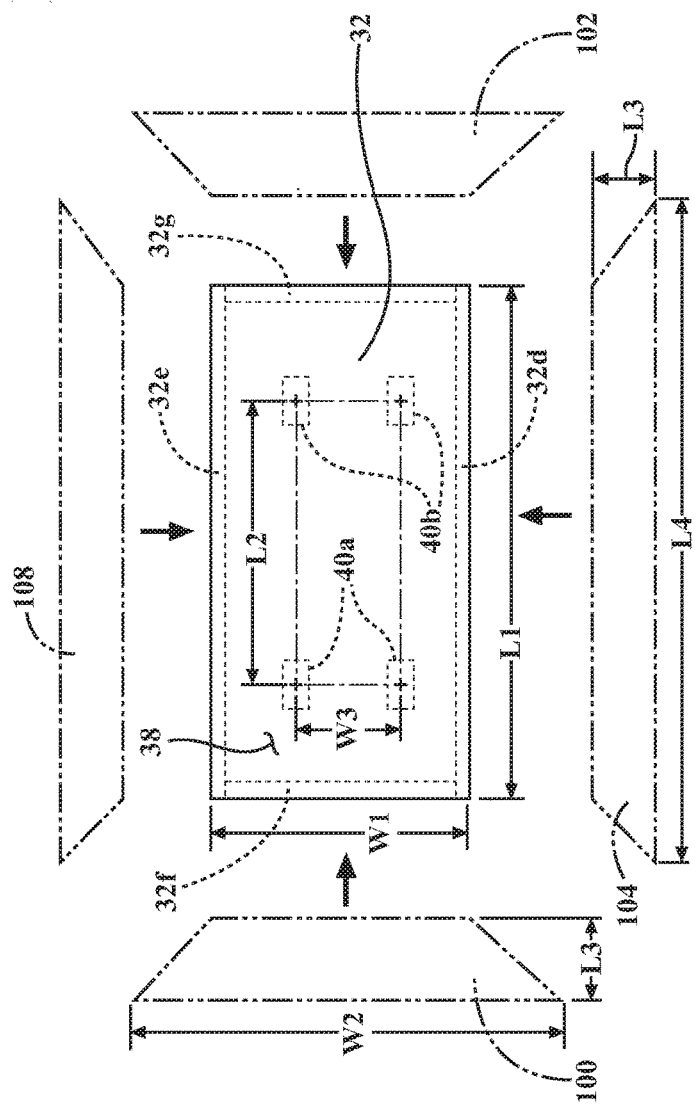
FIG. 1
FIG. 2

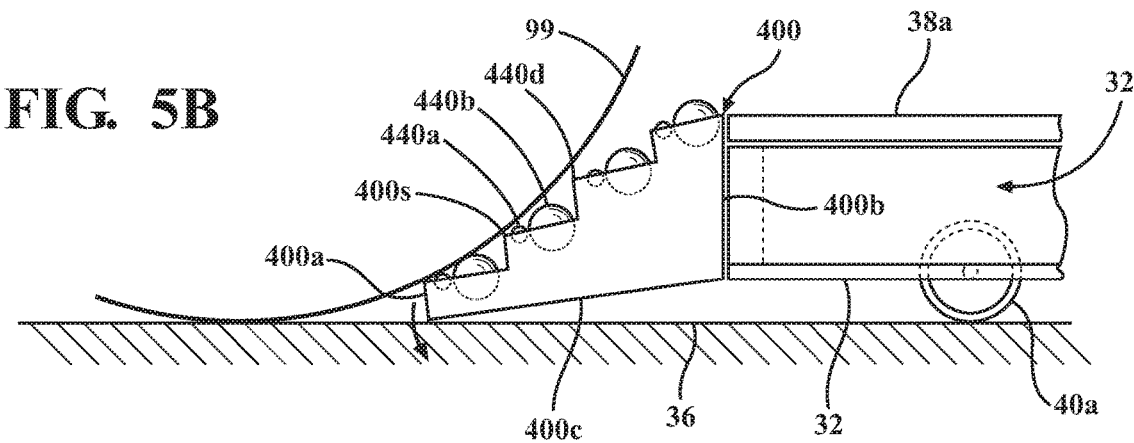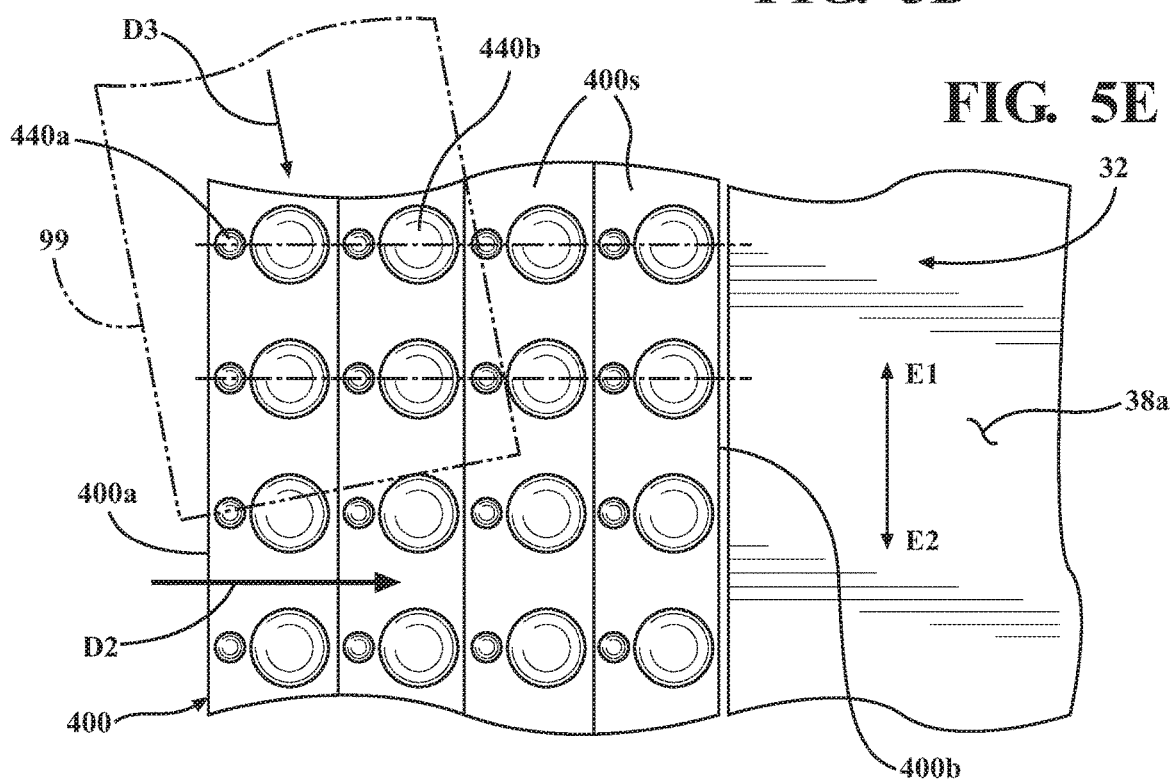

MOBILE PLATFORM BUMPER INCORPORATING A RAMP STRUCTURE

TECHNICAL FIELD

The subject matter described herein relates to systems and methods, including guided mobile platforms and guided soft targets, for testing crash avoidance technologies.

BACKGROUND

As Advanced Crash Avoidance Technologies (ACATs) such as Forward Collision Warning (FCW), Crash Imminent Braking Systems and other advanced technologies continue to be developed, the need for full-scale test methodologies that can minimize hazards to test personnel and damage to equipment has rapidly increased. A guided test platform may be utilized for testing vehicle technologies incorporated into a conventional passenger vehicle. The guided test platform may be structured to simulate aspects of a conventional vehicle so that a conventional passenger vehicle (or subject vehicle) may contact the guided test platform in a collision scenario. The guided test platform may be designed so that the subject vehicle may collide with and drive over the top of the guided test platform without damage to either the test platform or the subject vehicle. This enables the testing of various technologies incorporated into the subject vehicle with minimal vehicle damage and no injury to personnel.

SUMMARY OF THE INVENTION

In one aspect of the embodiments described herein, a bumper for a mobile platform of a guided test platform is provided. The bumper includes a first end, a second end residing opposite the first end, a first surface extending between the first and second ends, and a second surface extending between the first and second ends and residing opposite the first surface. The bumper defines a ramp structure extending between the bumper first end and the bumper second end. The ramp structure is structured to guide a wheel of a vehicle in a direction away from the first surface as the wheel moves along the second surface in a direction from the bumper first end toward the bumper second end.

In another aspect of the embodiments described herein, a guided test platform is provided. The guided test platform includes a mobile platform structured to be movable along a ground surface and a bumper extending from at least one side of the mobile platform so as to be suspended above the ground surface when the mobile platform resides on the ground surface. The bumper is structured to be deformable to contact the road surface so as to form a ramp structure extending generally upwardly from the ground surface responsive to contact between a subject vehicle and the bumper when the bumper is attached to the mobile platform. The ramp structure is structured to support at least a portion of a weight of the subject vehicle and is structured to guide the vehicle in a direction from the ground surface toward a top surface of the mobile platform.

BRIEF DESCRIPTION OF THE DRAWINGS

The accompanying drawings, which are incorporated in and constitute a part of this specification, illustrate embodiments described herein and together with the description serve to explain principles of embodiments described herein.

FIG. 1 is a schematic side view of a guided test platform including a mobile platform and a bumper incorporating a ramp structure in accordance with an embodiment described herein mounted to a side of the mobile platform.

FIG. 2 is an exploded plan view of a guided test platform showing how bumpers in accordance with embodiments described herein may be attached to sides of the mobile platform shown in FIG. 1.

FIG. 5B is the schematic side view of FIG. 5A showing the bumper after contact with the wheel of the subject vehicle.

FIG. 5C is a schematic side view of an end of a mobile platform incorporating a bumper in accordance with a particular embodiment similar to the embodiment shown in FIG. 5A.

FIG. 5D is a schematic cross-sectional view of a portion of the bumper embodiment shown in FIG. 5A.

FIG. 5E is a schematic plan view of a portion of the bumper shown in FIG. 5A being contacted by a subject vehicle wheel in a direction crosswise or substantially perpendicular to a direction ascending the steps of the bumper.

DETAILED DESCRIPTION

Figure 3A:
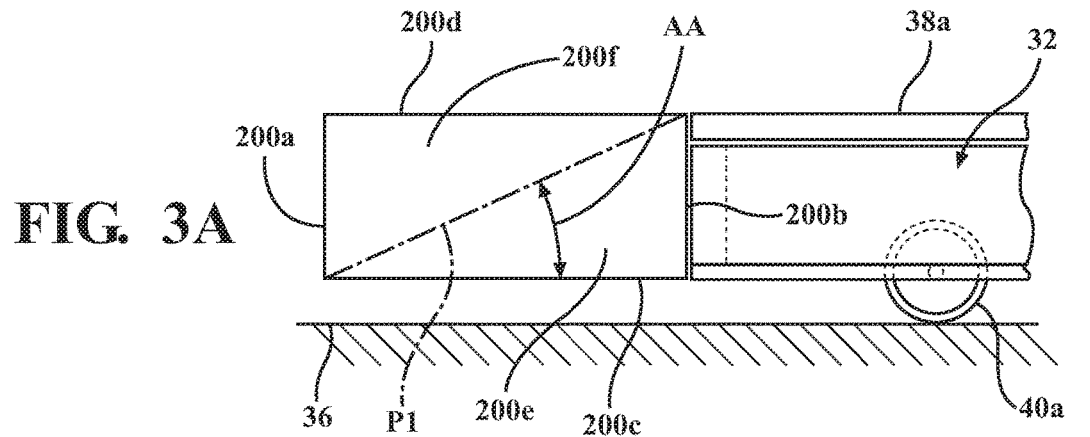
FIG. 3A is a schematic side view of an end of a mobile platform incorporating a bumper in accordance with an embodiment described herein, shown prior to contact with a rotating wheel of a subject vehicle.

In one or more arrangements described herein, a bumper for a mobile platform of a guided test platform includes a first end, a second end residing opposite the first end, a first surface extending between the first and second ends, and a second surface extending between the first and second ends and residing opposite the first surface. The bumper defines a ramp structure extending between the bumper first end and the bumper second end. The ramp structure is structured to guide a wheel of a vehicle in a direction away from the first surface as the wheel moves along the second surface in a direction from the bumper first end toward the bumper second end. The bumper may be deformable in a direction toward a ground surface responsive to contact between the bumper and a wheel of the vehicle. The ground surface may aid in supporting the bumper as the vehicle wheel moves along and up the ramp structure toward a top surface of the mobile platform.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5E, but the embodiments are not limited to the illustrated structure or application.

It will be appreciated that for simplicity and clarity of illustration, where appropriate, reference numerals have been repeated among the different figures to indicate corresponding or analogous elements and/or features. In addition, similar elements appearing in different views have been given similar reference numerals. Also, numerous specific details are set forth in order to provide a thorough understanding of the embodiments described herein. However, it will be understood by those of ordinary skill in the art that the embodiments described herein can be practiced without these specific details.

FIG. 1 is a schematic side view of a guided test platform 30 in accordance with embodiments described herein. The guided test platform 30 may be structured to enable a subject vehicle (not shown) to drive into and/or onto a top surface of the test platform without damage to either the subject vehicle or the test platform. The subject vehicle may be a conventional motor vehicle (such as a passenger sedan, for example). The guided test platform may be structured to operate autonomously in the same environment as the subject vehicle, where the platform and the test vehicle may interact. For test purposes, a structure (not shown) simulating a vehicle chassis may be mounted onto a top surface of the guided test platform to create a "guided soft target" usable for testing subject vehicle sensors, warning systems, and occupant protection systems. This guided soft target may operate autonomously or under remote control so as to interact with subject vehicles in any of a variety of test scenarios. Alternatively, some or all operations of the guided test platform 30 may be controlled remotely, for example, by radio control from a remote station (not shown).

In embodiments described herein, the guided test platform 30 may include a mobile platform 32. Mobile platform 32 may include a base 32a. Base 32a may include a floor 32c. Opposed side walls 32d, 32e may extend from corresponding sides of floor 32c to form sides of the mobile platform 32. Walls 32d, 32e may be structured to enable attachment of bumpers thereto, as described herein.

Opposed end walls 32f, 32g may extend from a front end 32k and a rear end 32m of base 32a to form front and rear walls of the mobile platform 32. In combination, walls 32d, 32e, 32f, and 32g may form an interior cavity 32n of the mobile platform 32. Interior cavity 32n may be structured for receiving therein various systems and components dedicated to propelling, stopping, guiding and otherwise operating the guided test platform 30 as the platform 30 moves along a ground or road surface 36. In one or more arrangements, walls 32d, 32e, 32f, and 32g may be structured to extend vertically from floor 32c when the base 32a is resting on a level ground surface.

A cover 38 may be secured to edges of walls 32d, 32e, 32f, and 32g to enclose the interior cavity 32n and to provide a surface 38a along which a subject vehicle may be driven as described herein after contacting the guided test platform.

Cover 38 is designed to enclose and protect the mobile platform systems and components contained in cavity 32n. Cover 38 may be attached to walls 32d, 32e, 32f, and 32g so as to be supported by the walls against a portion of the weight of a subject vehicle traveling along an outer or top surface 38a of the cover 38 when the guided test platform 30 resides on a ground or road surface, as shown in FIG. 1. When the guided test platform 30 is positioned on a ground or road surface 36, the cover outer surface 38a may form the top surface of the mobile platform 32. Cover 38 may be structured and attached to walls 32d, 32e, 32f, and 32g so as to support at least a portion of the weight of a subject vehicle with little or no deflection of the cover, and so that the cover 38 deflects elastically (if at all) responsive to the applied portion of the subject vehicle weight.

For testing purposes, a structure (not shown) simulating a vehicle chassis may be mounted onto the mobile platform top surface 38a to create a "guided soft target" usable for testing subject vehicle sensors, warning systems, and occupant protection systems. This guided soft target may operate autonomously or under remote control so as to interact with subject vehicles in any of a variety of test scenarios.

The mobile platform 32 may be suspended above the ground surface 36 by a plurality of wheels 40a, 40b. The wheels 40a, 40b may be mounted to the base 32a via wheel mountings (not shown) located inside the base internal cavity 32n. The wheels 40a, 40b may extend through the base floor 32c to the base exterior via openings formed in the base floor 32c. The wheels 40a, 40b may include drive wheels designed to move or propel the guided test platform, and non-drive wheels. In one or more arrangements, all of the wheels 40a, 40b may be drive wheels designed to simply support the platform. In other arrangements, some of the wheels may be drive wheels and other wheels may be non-drive wheels. The drive wheels may be operably coupled to (or be incorporated into) a mobile platform propulsion system (not shown) structured to rotate the drive wheels to propel the guided test platform 30 along the ground surface 36. At least a portion of the mobile platform wheels 40a, 40b may be structured to be steerable by a mobile platform steering system (not shown), to guide the mobile platform 32 along the ground surface. The embodiment shown in FIG. 1 includes drive wheels 40b and non-drive, steerable wheels 40a.

In one or more arrangements, the mobile platform wheels 40a, 40b may be mounted to the mobile platform base 32a so as to retract into the base openings responsive to application of a portion of the weight of a subject vehicle exerted on the mobile platform cover 38 when the subject vehicle rides along the cover 38. This may aid in preventing damage to the wheels 40a, 40b and other elements of the propulsion system due to loading by the subject vehicle.

For example, the wheels 40a, 40b and associated wheel mountings may be structured to retract or recess into the base openings (and, optionally, into the base cavity 32n) responsive to application of a force on the wheel mountings exceeding a certain predetermined threshold. In one or more arrangements, the predetermined threshold force may be set high enough so that the wheels 40a, 40b retract into the base openings only when at least one wheel of the subject vehicle resides on the top surface 38a of the mobile platform 32. In one or more arrangements, the predetermined threshold force may be set low enough so that one or more of the wheels 40a, 40b retract into the base openings when the threshold force is due to a subject vehicle wheel riding up a ramp embodiment as described herein, in a direction toward the top surface 38a. In this embodiment, retraction of one or more of the wheels 40a, 40b may occur prior to a subject vehicle wheel contacting the cover top surface 38a.

Referring now to FIGS. 1 and 2, the guided test platform 30 may also include one or more bumpers coupled to sides of the mobile platform 32 and incorporating ramp structures. FIG. 1 shows schematically the attachment of a single bumper 100 to a front end 32p of the mobile platform. FIG. 2 is an exploded plan view of the guided test platform shown in FIG. 1 showing how bumper 100 and various additional bumpers 102, 104, 108 may be attached to the sides of the mobile platform 32. Although different embodiments of the bumpers are described herein, any embodiment of a bumper may be structured for attachment to any side of the mobile platform 32, and any side of the mobile platform may be structured for attachment of any embodiment of a bumper thereto. In addition, different embodiments of the bumpers may be attached to associated different sides of the mobile platform 32, depending on the requirements of particular test scenarios.

Although common characteristics of the bumpers will be described with reference to the bumper embodiment 100 shown in FIG. 1, it will be understood that all of the bumper embodiments may have certain similar overall characteristics. Referring to FIG. 1, in one or more arrangements described herein, a bumper 100 may include a first end 100a and a second end 100b residing opposite the first end 100a. The bumper first end 100a may be an end spaced farthest from the mobile platform 32 and may be positioned to make initial contact with a wheel of a subject vehicle (not shown). The bumper second end 100b may be an end closest to the mobile platform 32 and may be mounted to a wall of the mobile platform 32. A first surface or bottom surface 100c of the bumper may extend between the bumper first end 100a and the second end 100b. A second or upper surface 100d of the bumper may extend between the first and second ends 100a, 100b and may reside opposite the first surface 100c. In one or more arrangements, and depending on the configuration of the bumper and a height of the bumper above the ground surface, upper surface 100d may also (in combination with first end 100a) be positioned to make initial contact with a wheel of a subject vehicle.

An embodiments of the bumper described herein may also define or incorporate therein a ramp structure extending between the first end and the second end. The ramp structure may be structured to guide a wheel of a subject vehicle in a direction away from the first surface 100c as the vehicle wheel moves along the second surface 100d in a direction extending from the bumper first end 100a toward the bumper second end 100b. When the bumper is attached to a mobile platform positioned on the ground surface as shown in FIG. 1, the ramp structure may guide a wheel of a subject vehicle upwardly toward the top surface 38a of the mobile platform 32.

As used herein, the term "ramp structure" refers to a structure which ascends or extends generally upwardly with respect to the ground surface 36 in a direction proceeding from the bumper first end 100a toward the bumper second end 100b when the bumper is mounted on a mobile platform 32 as described herein. The ramp structure may be structured to support the weight of a portion of a vehicle (as transmitted to the ramp structure though a rotating subject vehicle wheel or tire) and to guide a subject vehicle wheel from a ground or road surface upwardly toward the uppermost or top surface 38a of the mobile platform, along which the subject vehicle wheel may ride as it runs over the mobile platform 32.

Bumper embodiments described herein may also be structured to be deformable so as to enable the bumper first end 100a to contact the ground surface 36 responsive to a force exerted by a subject vehicle wheel in a direction toward the ground surface, when the bumper is attached to a side of the mobile platform 32. Thus, the ramp structure supporting a subject vehicle wheel moving along the bumper second surface 100d may be supported at and near the bumper first end 100a by the ground surface and at the bumper second end 100b by the attachment of the bumper 100 to the mobile platform 32. As used herein, "deformable" means that the bumper may have a first, unloaded shape when attached to (and supported by) the mobile platform 32 and prior to contact with a subject vehicle, and one or more second shapes resulting from forces exerted by the subject vehicle after contact with the subject vehicle. The bumpers may be attached to the mobile platform 32 using any method suitable for purposes described herein. For example, a bumper may have threaded inserts secured in an end thereof and structured for mounting to an associated mobile platform wall, and suitable bolts or studs may be used to attach the bumper to the mobile platform wall using the threaded inserts.

Depending on the bumper structure and the material(s) from which the bumper is formed, the bumper may deform elastically (i.e., such that the bumper will return to its original shape after removal of the force applied by the subject vehicle) or plastically (i.e., so that the bumper will retain its deformed shape after removal of the force applied by the subject vehicle). Also, certain portions of the bumper may deform elastically responsive to loading while other portions deform plastically responsive to loading. In one or more arrangements, the bumper first end may be structured to extend vertically or substantially vertically with respect to the ground surface 36 when the bumper 100 is attached to a mobile platform 32 and the mobile platform resides on the ground surface 36, and prior to contact between the subject vehicle and the bumper 100. For example, FIG. 3A shows a bumper first end 200a extending vertically with respect to the ground surface 36 when the bumper 200 is attached to the mobile platform 32 and the mobile platform resides on the ground surface 36, and prior to contact between the subject vehicle and the bumper 200. As used herein, the term "substantially" includes exactly the term it modifies and slight variations therefrom. Thus, the term "substantially vertically" means exactly vertically and slight variations therefrom. In this particular example, slight variations therefrom can include about 10 degrees or less starting from a location of the first end designed to be closest to the ground surface when the bumper is mounted on the mobile platform, and proceeding in a direction toward the mobile platform 32.

Figure 3B:
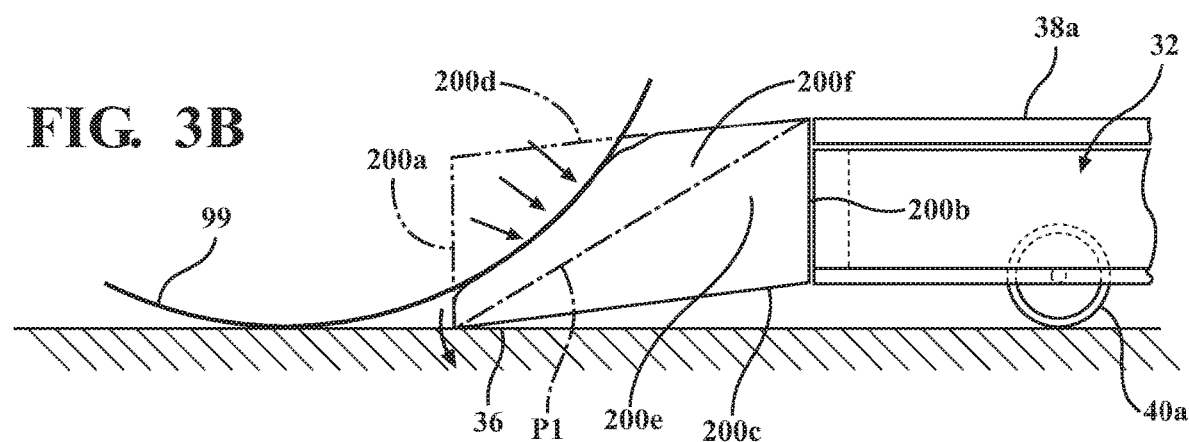
FIG. 3B is the schematic side view of FIG. 3A showing the bumper after contact with the wheel of the subject vehicle.

Referring to FIGS. 3A-3B, in one or more arrangements, a bumper 200 may define a plane P1 extending between the bumper first end 200a and the bumper second end 200b. The plane P1 may reside between the bumper first and second surfaces 200c and 200d. In one or more arrangements, the plane P1 may extend as shown in the drawings, from an intersection of bumper first end 200a and first surface 200c to an intersection of bumper second surface 200d and second end 200b. In other arrangements the plane P1 may extend from first surface 200c to second surface 200d. In other arrangements, the plane P1 may extend from first end 200a to second end 200b.

The deformability characteristics of the portions of the bumper embodiments responsive to applied loads may be described and/or specified herein in terms one or more pertinent material properties. In embodiments described herein, Shore hardness will be used. However, it will be understood that the deformation properties of the bumper portions and embodiments may alternatively be described using other material properties, for example, elastic modulus. For example, as known in the pertinent art, a Shore hardness value may be converted to an elastic modulus using a suitable conversion factor or formula. Thus, the deformability characteristics of the bumper material may be expressed in terms of an elastic modulus value (or range of values) that is equivalent to a specified Shore hardness value (or range of values). In addition, one or more other material properties may be used to described the bumper materials instead of (or in addition to) Shore hardness or elastic modulus.

A Shore hardness of a material forming the portion 200e of the bumper between the plane P1 and the bumper first surface 200c may have at least a first predetermined value. In addition, the plane P1 may extend at a first non-zero angle AA with respect to the bumper first surface 200c. The first predetermined value of the Shore hardness may be specified to be sufficiently high to ensure that the shape of the portion 200e of the bumper 200 between the plane P1 and the bumper first surface 200c (and also the non-zero angle AA formed between the first surface 200c and the plane P1) will be maintained or substantially maintained under the forces exerted by one or more wheels 99 of a subject vehicle moving over the bumper second surface 200d. This ensures an intact ramp structure along which the subject vehicle will travel generally upwardly as the vehicle moves along the bumper second surface 200d toward the top surface 38a of the mobile platform cover 38.

In addition, the Shore hardness of the material forming the portion 200f of the bumper 200 between the plane P1 and the second surface 200d may have a value below the first predetermined value. In particular embodiments, the Shore hardness of the material forming the portion 200f of the bumper 200 between the plane P1 and the second surface 200d may be specified to be sufficiently low that the material may experience a large degree of deformation (either elastic or plastic deformation) responsive to direct contact with a vehicle wheel 99.

In one or more arrangements, both the material forming the portion 200e of the bumper between the plane P1 and the bumper first surface 200c, and the material forming the portion 200f of the bumper 200 between the plane P1 and the second surface 200d may have a Shore hardness (using the ASTM D2240 type D scale) in the range 50D-75D inclusive.

Referring to FIG. 3B, upon colliding with the bumper 200, the subject vehicle wheel 99 may contact the portion 200f of the bumper 200 between the plane P1 and the second surface 200d and begin to deform the material of portion 200f as shown. As the material of portion 200f deforms, the subject vehicle wheel 99 may ride upwardly and onto the bumper second or upper surface 200d while continuing to deform the material of portion 200f. As the material of portion 200f deforms due to contact with the subject vehicle wheel 99, the material absorbs energy of the collision between the bumper 200 and the subject vehicle (i.e., the collision energy is dissipated in deforming the material of bumper portion 200f). The subject vehicle wheel 99 moves along the second surface 200d as it deforms the material of portion 200f.

Thus, embodiments of the bumper described herein may be structured to absorb energy by deforming and/or deflecting responsive to a force having a downward or vertical component, as well as a horizontal component. For example, referring to FIG. 3B, the first end 200a of the bumper 200 may deflect downwardly into contact with the ground surface 36 responsive to contact with the subject vehicle wheel 99 and, as just described, the material forming the bumper may deform responsive to the downward forces exerted by the wheel on the bumper second surface 200d after the wheel rides up on top of the bumper.

In the embodiment shown in FIGS. 3A-3B, the ramp structure is provided by the material forming the portion 200e of the bumper between the plane P1 and the bumper first surface 200c, and the deformed material forming bumper portion 200f positioned between the subject vehicle wheel 99 and the plane P1. In particular embodiments, the material forming bumper portion 200f and the material forming bumper portion 200e may be grades or variations of the same material having different Shore hardness values. In particular embodiments, the material forming bumper portion 200f and the material forming bumper portion 200e material may be different materials.

Figure 3C:
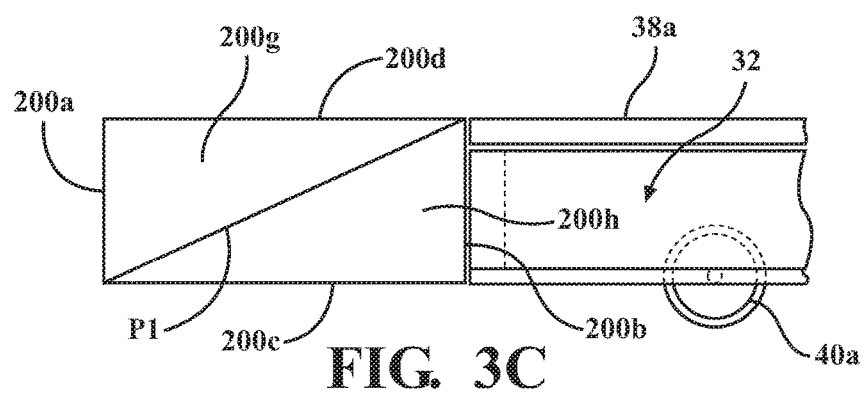
FIG. 3C is a schematic side view of an end of a mobile platform incorporating a bumper in accordance with another embodiment described herein.

Referring to FIGS. 3A-3C, in particular embodiments, the bumper 200 may be formed from two separate pieces of material 200g and 200h. Bumper first piece 200h may incorporate the bumper first surface 200c and may form the portion of the bumper between first surface 200c and plane P1 having a relatively higher Shore hardness value, while bumper second piece 200g may incorporate the bumper second surface 200d and may form the portion of the bumper between plane P1 and second surface 200d having a relatively lower Shore hardness value. In this embodiment, the plane P1 may be defined by a surface of the first piece 200h of material. The two bumper pieces 200g, 200h may be attached to each other as shown using any method (for example, fasteners, adhesive bonding, etc.) that will keep them attached under loading by the subject vehicle wheels 99 as described herein.

Figure 3D:
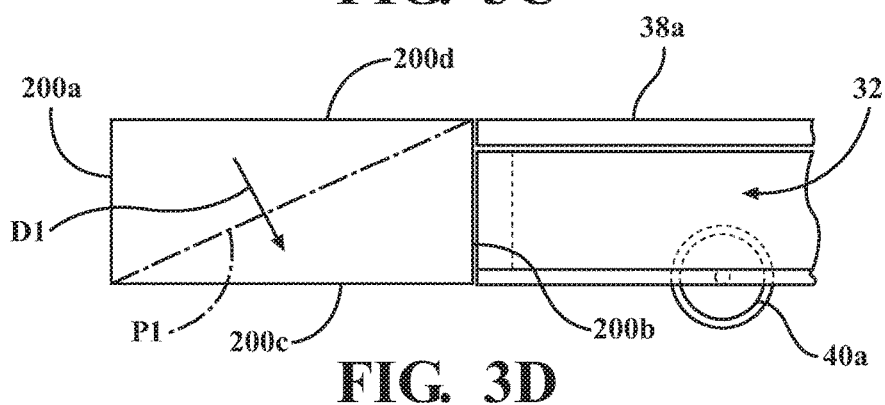
FIG. 3D is a schematic side view of an end of a mobile platform incorporating a bumper in accordance with yet another embodiment described herein.

Referring to FIG. 3D, in particular embodiments, the bumper 200 may be formed from a functionally graded material, such as a functionally graded polymer or rubber. As known in the pertinent art, a functionally graded material is a material having a progressive compositional and/or material property gradient extending from one side to another side of a layer of the material. In one or arrangements, functionally graded materials usable for the purposes herein may have a Shore hardness value (and an elastic modulus) which progressively increases along a portion of the bumper extending between the bumper second surface 200d and the plane P1, and in a direction D1 leading from the second surface 200d toward the first surface 200c and extending in a direction D1 perpendicular or substantially perpendicular to the plane P1.

In a bumper embodiment formed using a functionally graded material, the plane P1 may be non-flat or slightly irregular due to the transitional nature of the material because the exact location in the material where the Shore hardness reaches at least the first predetermined value may vary to a small degree within the material. However, a functional plane P1 may be defined within the material comprising a collection of points where the value of the Shore hardness is at least the first predetermined value.

Varying the Shore hardness of the ramp structure in the direction D1 shown provides a functional ramp structure having a Shore hardness of at least the first predetermined value and which ascends or extends upwardly in a direction toward the second end 200b of the bumper 200. This functional ramp structure is overlaid with the relatively lower Shore hardness-value, more deformable material forming the portion of the bumper between second surface 200d and plane P1.

Figure 4A:
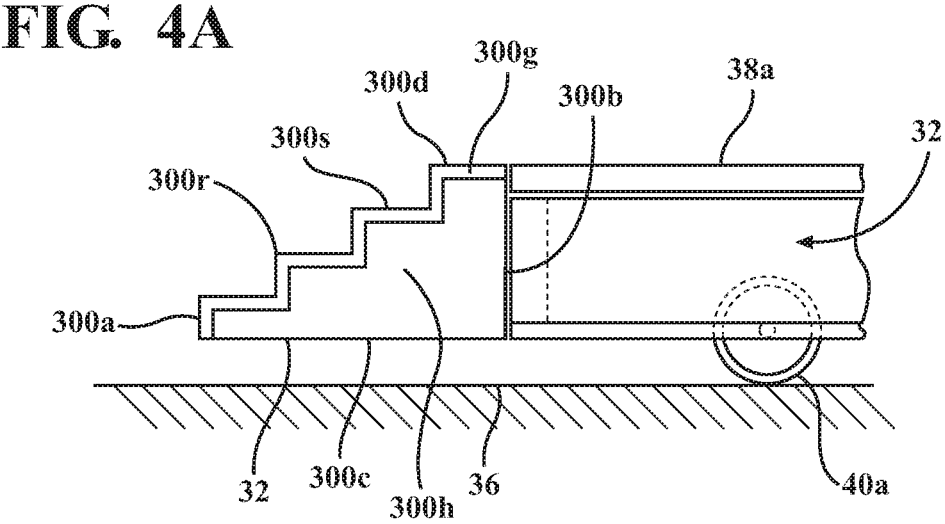
FIG. 4A is a schematic cross-sectional side view of an end of a mobile platform incorporating a bumper in accordance with yet another embodiment described herein, shown prior to contact with a rotating wheel of a subject vehicle.
Figure 4B:
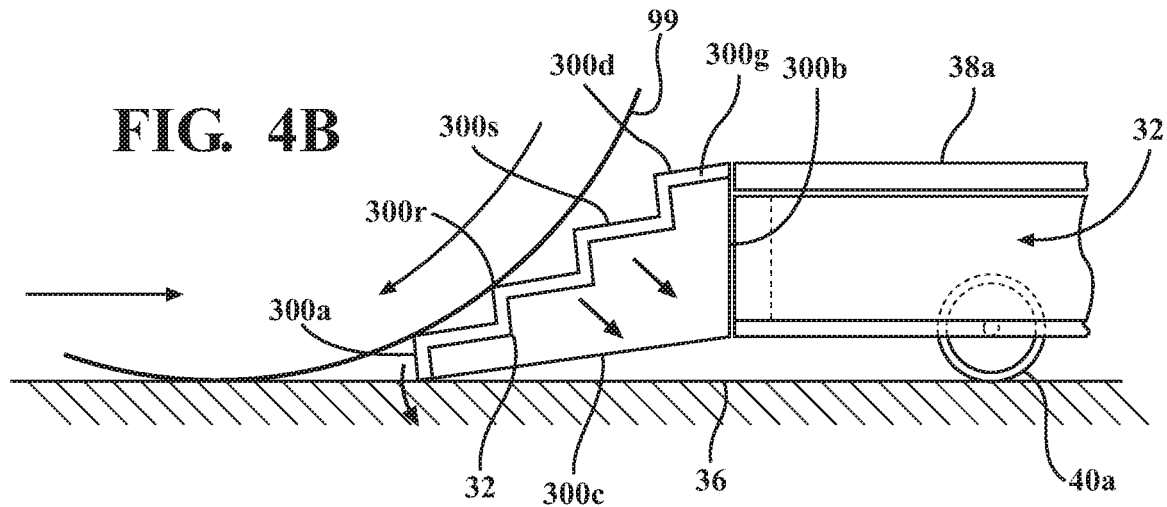
FIG. 4B is the schematic cross-sectional side view of FIG. 4A showing the bumper after contact with the wheel of the subject vehicle.

FIGS. 4A-4B are schematic side views of an end of a guided test platform incorporating another embodiment 300 of the bumper. Referring to FIGS. 4A-4B, in one or more arrangements, the bumper second surface 300d may include a plurality of steps 300s formed therein and arranged so that the second surface 300d ascends when proceeding in a direction from the bumper first end 300a toward the bumper second end 300b when the bumper 300 is oriented such that the bumper first surface 300c is positioned spaced apart from and opposite the ground surface 36.

The steps 300s may be structured to extend parallel with the ground surface 36 when the bumper 300 is attached to the mobile platform 32. The ascending steps 300s may define a ramp structure which ascends in a direction from the ground surface 36 toward the mobile platform cover top surface 38a.

Referring to FIGS. 4A-4B, in particular embodiments, the bumper 300 may include a first, uppermost portion 300g including the second surface 300d structured as the plurality of steps 300s. The first portion 300g may be formed from a material having a Shore hardness of at least a first predetermined value. A second portion 300h of the bumper 300 may extend between the bumper first surface 300c and the bumper first portion 300g. The second portion 300h may have a Shore hardness below the first predetermined value. The material forming the second portion 300h may be different from the material forming the first portion 300g. The first portion 300g may be formed as a part separate from the second portion 300h.

The Shore hardness value of the first portion 300g may be specified so as to maintain the stepped configuration or shape after loading by the subject vehicle wheel(s) 99, so that the wheel(s) may "climb" the ascending steps 300s. The subject vehicle wheel(s) 99 may engage the corners 300r and portions of the horizontal surfaces of the steps 300s during the ascent, to propel the subject vehicle along the bumper second surface 300d and onto the top of the mobile platform cover 38.

The Shore hardness value of the bumper second portion 300h may be specified so as to enable the second portion to deform responsive to the weight of the subject vehicle wheel(s), as applied to the material of the second portion 300h through the stepped first portion 300g. Thus, the bumper second portion 300h may absorb energy of collision with the subject vehicle wheel(s) 99 by deforming, either elastically or plastically, while the steps 300s of the first portion 300g are maintained and reside atop the deflecting material of the second portion 300h to provide a functional ramp structure.

In addition, and as described herein with regard to other bumper embodiments, the bumper first end 300a may be structured to deflect downwardly into contact with the ground surface 36 responsive to the subject vehicle wheel(s) 99 contacting the bumper first end 300a and/or bumper second surface 300d. Then the bumper stepped first portion 300g and the ramp structure are supported by the ground surface 36 and the attachment to the mobile platform 32 as the subject vehicle wheel(s) 99 ascend the steps 300s.

Figure 5A:
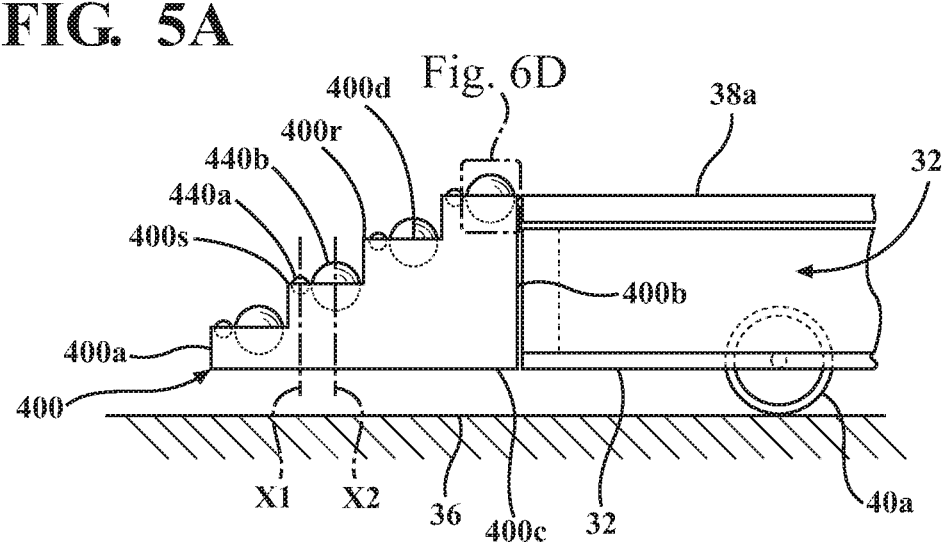
FIG. 5A is a schematic side view of an end of a mobile platform incorporating a bumper in accordance with yet another embodiment described herein, shown prior to contact with a rotating wheel of a subject vehicle.

FIGS. 5A-5E are schematic side views of another embodiment 400 of the bumper. Referring to FIGS. 5A-5B, in one or more arrangements, the bumper 400 may include a stepped second surface 400d structured as a plurality of steps 400s as previously described with regard to FIGS. 4A-4B. In addition, each step 400s may have at least one roller element (generally designated 440) rotatably mounted thereon so as to project above a level of the step, and so as to be rotatable with respect to the step responsive to contact with a rotating wheel 99 of the subject vehicle as the wheel moves along the second surface 400d in the direction from the bumper first end 400a toward the bumper second end 400b. FIG. 5A is a side view of a bumper embodiment 400 incorporating roller elements 440 on the steps, shown mounted to a side of the mobile platform and prior to contact with a wheel of a subject vehicle. FIG. 5B is the view of FIG. 5A showing the bumper 400 after contact with the subject vehicle wheel 99, with the bumper first end 400a deflected downwardly to make contact with the ground surface 36.

In the embodiment shown, multiple roller elements 440 are mounted in each step 400s. The roller elements 440 may decrease contact friction between the subject vehicle wheel(s) 99 and the bumper material to allow the subject vehicle wheel(s) 99 to roll along the bumper second surface 400d and up the steps 400s more easily, especially in cases where the subject vehicle wheel(s) 99 impacts the bumper more obliquely as shown in FIG. 5E. Roller elements 440 may be ball bearings, cylindrical roller elements, or any other suitable type of roller elements.

Referring to FIGS. 5A-5E, in particular embodiments, each step 400s of the bumper 400 may have at least one first roller element 440a and at least one second roller element 440b mounted therein. The embodiment shown in FIGS. 5A-5E includes multiple first roller elements 440a and multiple second roller elements 440b. Each of the first roller elements 440a may be mounted in the step 440s so as to reside between the bumper first end 400a and the an associated second roller element 440b. Each second roller element 440b may be mounted in the step 440s so as to reside between an associated first roller element 440a and the bumper second end 200b. In addition, each second roller element may have a diameter greater than an associated first roller element on the same step. This arrangement aids in maintaining a sequence of ascending contact surfaces which are engaged by the subject vehicle wheel(s) 99 as the wheel(s) ascend the bumper steps 400s.

Referring to FIG. 5B, as described herein with regard to other bumper embodiments, the bumper first end 400a may be structured to deflect downwardly into contact with the ground surface 36 responsive to the subject vehicle wheel(s) 99 contacting the bumper first end 400a. The bumper 400 is then supported by the ground surface and the attachment of the bumper 400 to the mobile platform 32 as the subject vehicle wheel(s) 99 ascends the steps. The wheel(s) 99 may engage the corners 400r and portions of the horizontal surfaces of the steps 400s as the wheel(s) 99 climb the ascending steps 400s, to propel the subject vehicle along the bumper second surface 400d and onto the top 38a of the mobile platform 32.

Referring to FIG. 5C, in more particular embodiments, the values of parameters such as the diameters of the roller elements 440a, 440b, the spacing between a plane X1 along which the rotational axes of roller elements 440a extend and a plane X2 along which the rotational axes of roller elements 440b extend along a step 400s, the dimensions of the steps 400s and other pertinent parameters may be specified such that outer surfaces of the roller elements 440a, 440b along adjacent ascending steps 400s contact a virtual plane P3 extending between the corners 400r-1 and 400r-2 of adjacent ones of steps 400s. This arrangement may provide a ramp structure in the form of a virtual plane P3 of ascending contact surfaces which are contacted by the subject vehicle wheel(s) 99 as the wheel(s) ascend the bumper steps 400s.

Thus, the ramp structure may be provided by the succession of ascending contact surfaces embodied in the step corners 400r and the roller elements 440. In addition, this arrangement may also aid in absorbing collision energy due to the forces exerted by the subject vehicle wheel(s) 99 on the roller elements 440. These forces are transmitted directly to portions of the bumper base material 400w which may otherwise not be in direct contact with the subject vehicle wheel(s) 99, or be subjected to forces exerted by the subject vehicle wheels.

Roller elements 440 may be mounted along steps 400s using any suitable method. For example, FIG. 5D shows a bumper 400 may be formed from a base material 400w and a generic roller element 440 molded into the base material 400w along a step 400s such that the central axes 440x of the roller elements are offset a distance M1 with respect to a step surface 400d so as to reside below the surfaces of the steps. This may retain the roller elements 440 within the bumper base material 400w during loading of the steps 400s. In particular embodiments, the base material 400w may be selected so as to minimize friction with the roller elements 440 as the roller elements rotate responsive to contact with the subject vehicle wheel(s) 99, while also having a Shore hardness value sufficient to maintain the stepped shape of the bumper second surface 440d during contact with the subject vehicle wheel(s) 99.

FIG. 5E shows a schematic plan view of a portion of the bumper 400 with horizontally-extending steps 400s being contacted by a subject vehicle wheel 99 in a direction D3 instead of along a direction D2 (where direction D2 is a direction that is "head on" with the steps 400s). The direction D3 may extend at a small angle with respect to the directions E1, E2 along which the steps extend parallel to an associated side of the mobile platform 32 to which the bumper 400 is attached.

Referring again to FIGS. 1 and 2, the various dimensions of the mobile platform 32 and the bumper embodiments 200-400 described herein may be specified so as to aid in preventing the guided test platform 30 from tilting upwardly and striking an undercarriage of the subject vehicle responsive to pressure by the subject vehicle wheels and also to facilitate movement of the subject vehicle wheel(s) up the various ramp structures and onto the cover top surface 38a. For example, referring to FIGS. 1 and 2, the dimension L1 (i.e., a total length of the mobile platform 32 without any bumpers mounted thereto) may be specified so as to be about 80 inches plus or minus 3 inches. The dimension L2 (a distance between rotational axes of the steerable wheels 40a and the drive wheels 40b) may be specified so as to be about 71 inches plus or minus 3 inches. The dimension L3 (a length of an exemplary bumper) may be specified so as to be about 17 inches plus or minus 3 inches. The dimension L4 (i.e., a total length of the guided test platform including bumpers with a bumper mounted to each end of the mobile platform 32, and also the maximum length of a bumper such as bumper 104 mounted to a side of the mobile platform 32) may be specified so as to be greater than or equal to the wheelbase of a typical subject vehicle (i.e., the distance from the centerline of the front axle to the centerline of the rear axle of the subject vehicle). In particular embodiments, the dimension L4 may be selected to be about 116 inches plus or minus 3 inches.

The dimension H1 (a ground clearance of the mobile platform 32 and bumpers with bumpers mounted on the mobile platform 32) may be specified so as to be about 0.75 inches plus or minus 0.1 inches. The dimension H2 (a distance of the mobile platform top surface 38a to the ground surface 36) may be specified so as to be about 4.1 inches plus or minus 0.3 inches. The dimension H3 (an overall height or thickness of a space envelope occupied by an exemplary bumper) may be specified so as to be about 3.7 inches plus or minus 0.3 inches. The dimension T1 (a distance from a front end 32p of the mobile platform 32 to the rotational axis of the steerable wheels 40a) may be specified so as to be about 5.5 inches plus or minus 2 inches. The dimension W1 (i.e., a total width of the mobile platform 32 without any bumpers mounted thereto) may be specified so as to be about 30 inches plus or minus 3 inches. The dimension W2 (a maximum width dimension of an exemplary bumper mounted to a front end 32p or a rear end of the mobile platform 32 opposite the front end, and also an overall width of the guided test platform 30 with bumpers mounted along each side of the mobile platform 32) may be specified so as to be about 66 inches plus or minus 3 inches. The dimension W3 (a distance between adjacent steerable wheels 40a and between adjacent drive wheels 40b) may be specified so as to be about 24 inches plus or minus 3 inches. Thus, when all of the bumpers in FIG. 2 are attached to the mobile platform as shown, an overall width dimension of the guided test platform 30 may be equal to W2, and an overall length dimension of the platform 30 may be equal to L4.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A bumper for a mobile platform of a guided test platform, the bumper comprising:
 a first end;
 a second end residing opposite the first end;
 a first surface extending between the first and second ends; and
 a second surface extending between the first and second ends and residing opposite the first surface,
 the bumper defining a ramp structure extending between the bumper first end and the bumper second end and structured to guide a wheel of a subject vehicle in a direction away from the first surface as the wheel moves along the second surface in a direction from the bumper first end toward the bumper second end, wherein the bumper defines a plane extending between the first and second ends and residing between the first and second surfaces, the plane extending at a first non-zero angle with respect to the first surface, wherein the bumper between the plane and the first surface comprises a first piece of material having a Shore hardness of at least a first predetermined value, and wherein the bumper between the plane and the second surface comprises a second piece of material formed separately from the first piece of material and having a Shore hardness of less than the first predetermined value.

2. The bumper of claim 1 wherein the bumper comprises a functionally graded material having a Shore hardness value which increases along a portion of the bumper extending between the second surface and the plane, and in a direction leading from the second surface toward the first surface and extending perpendicular to the plane.

3. The bumper of claim 1 wherein the bumper is structured to be deformable so as to enable the bumper first end to contact a ground surface responsive to a force exerted by a vehicle wheel in a direction toward the ground surface, when the bumper is attached to a mobile platform residing on the ground surface.

4. The bumper of claim 1 wherein the bumper first end is structured to extend vertically or substantially vertically with respect to a ground surface when the bumper is attached to a mobile platform and the mobile platform resides on the ground surface.

5. A mobile platform including a bumper in accordance with claim 1.

6. A bumper for a mobile platform of a guided test platform, the bumper comprising:
- a first end;
- a second end residing opposite the first end;
- a first surface extending between the first and second ends; and
- a second surface extending between the first and second ends and residing opposite the first surface,
- the bumper defining a ramp structure extending between the bumper first end and the bumper second end and structured to guide a wheel of a subject vehicle in a direction away from the first surface as the wheel moves along the second surface in a direction from the bumper first end toward the bumper second end, the bumper having a first portion including the second surface, the second surface including a plurality of steps formed therein and arranged so that the second surface ascends when proceeding in a direction from the first end toward the second end when the bumper is oriented such that the first surface is positioned spaced apart from and opposite a ground surface, the first portion being formed from a material having a Shore hardness of at least a first predetermined value, the bumper also including a second portion including the first surface and extending between the first surface and the first portion, the second portion having a Shore hardness value below the first predetermined value.

7. A bumper for a mobile platform of a guided test platform, the bumper comprising:
- a first end;
- a second end residing opposite the first end;
- a first surface extending between the first and second ends; and
- a second surface extending between the first and second ends and residing opposite the first surface,
- the bumper defining a ramp structure extending between the bumper first end and the bumper second end and structured to guide a wheel of a subject vehicle in a direction away from the first surface as the wheel moves along the second surface in a direction from the bumper first end toward the bumper second end, wherein the second surface includes a plurality of steps formed therein and arranged so that the second surface ascends when proceeding in a direction from the first end toward the second end when the bumper is oriented such that the first surface is positioned spaced apart from and opposite a ground surface, and wherein each step of the plurality of steps has at least one roller element mounted thereon so as to project above a level of the step, and so as to be rotatable with respect to the step responsive to contact with a rotating wheel of a vehicle moving along the second surface in the direction from the first end toward the second end.

8. The bumper of claim 7 wherein each step of the bumper has at least one first roller element and at least one second roller element mounted therein, wherein the at least one first roller element is mounted in the step so as to reside between the bumper first end and the at least one second roller element, the at least one second roller element is mounted in the step so as to reside between the at least one first roller element and the bumper second end, and wherein the at least one second roller element has a diameter greater than the at least one first roller element.

9. The bumper of claim 7 wherein the at least one roller element is a ball bearing.

10. The bumper of claim 7 wherein the at least one roller element is a cylindrical roller.

11. A guided test platform comprising:
- a mobile platform structured to be movable along a ground surface; and
- a bumper extending from at least one side of the mobile platform so as to be suspended above the ground surface when the mobile platform resides on the ground surface,
- wherein the bumper is structured to be deformable to contact the ground surface so as to form a ramp structure extending generally upwardly from the ground surface responsive to contact between a subject vehicle and the bumper when the bumper is attached to the mobile platform, and wherein the ramp structure is structured to support at least a portion of a weight of the subject vehicle and is structured to guide the subject vehicle in a direction from the ground surface toward a top surface of the mobile platform.

12. The guided test platform of claim 11 wherein the bumper has a first end, a second end residing opposite the first end, a first surface extending between the first and second ends, and a second surface extending between the first and second ends and residing opposite the first surface, and wherein a portion of the bumper including the first surface comprises a first piece of material having a Shore hardness of a first predetermined value, and wherein the a portion of the bumper including the second surface comprises a second piece of material formed separately from the first piece of material and having a Shore hardness different the first predetermined value.

13. The guided test platform of claim 11 wherein the bumper has a first end, a second end residing opposite the first end, a first surface extending between the first and second ends, and a second surface extending between the first and second ends and residing opposite the first surface, wherein the ramp structure extends between the bumper first end and the bumper second end, and wherein the second surface includes a plurality of steps formed therein and arranged so that the second surface ascends when proceeding in a direction from the first end toward the second end when the bumper is oriented such that the first surface is positioned spaced apart from and opposite a ground surface, and wherein each step of the plurality of steps has at least one roller element mounted thereon so as to project above a level of the step, and so as to be rotatable with respect to the step responsive to contact with a rotating wheel of a vehicle moving along the second surface in the direction from the first end toward the second end.

* * * * *